May 16, 1939.    A. M. FRANCHI    2,158,818
BRAKE SHOE
Filed Aug. 13, 1936    2 Sheets-Sheet 1

INVENTOR
ALDO M. FRANCHI

ATTORNEYS

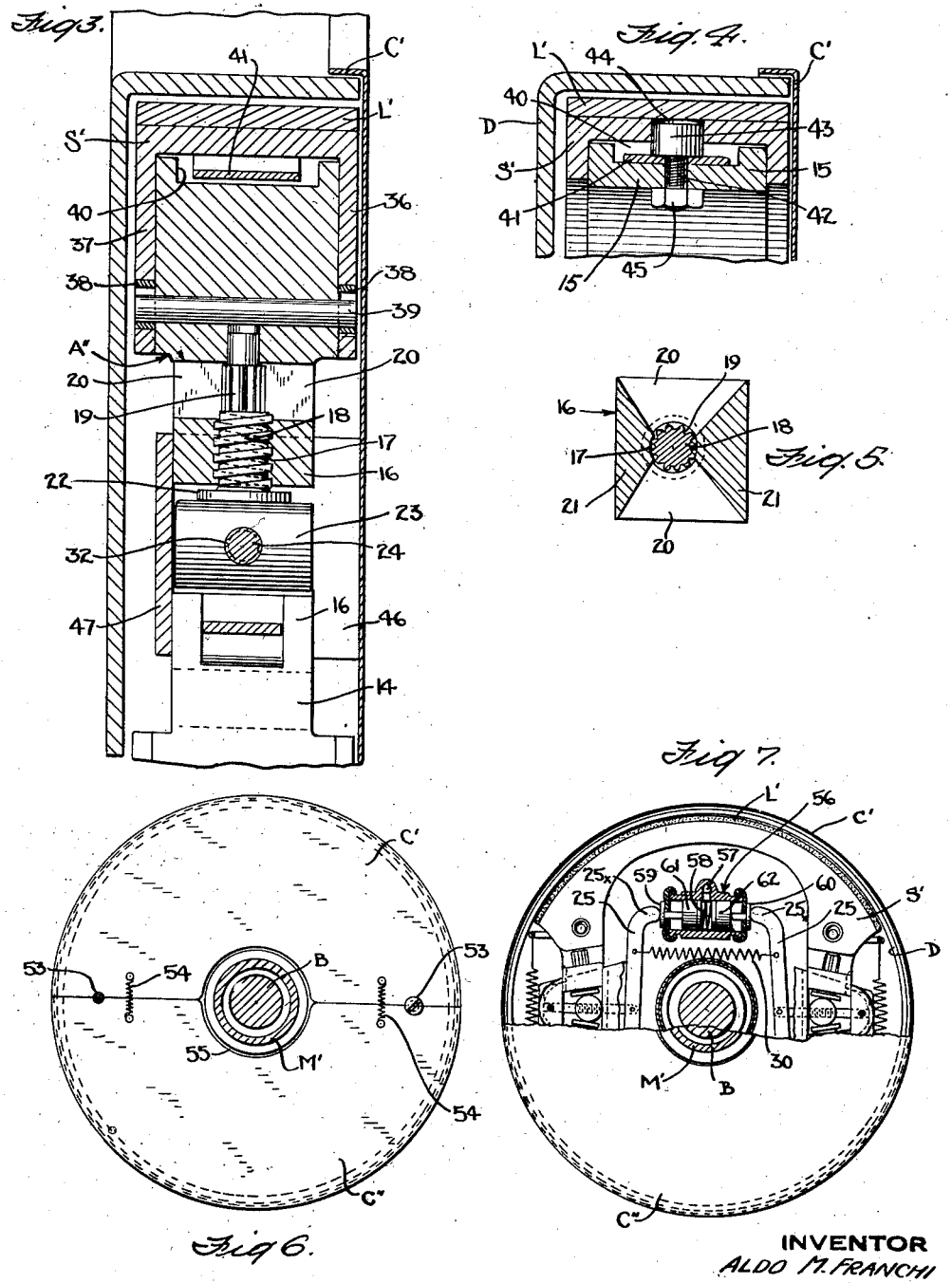

Patented May 16, 1939

2,158,818

UNITED STATES PATENT OFFICE 2,158,818

BRAKE SHOE

Aldo M. Franchi, New York, N. Y., assignor to Aero Safety Brake, Inc., New York, N. Y., a corporation of New York Application August 13, 1936, Serial No. 95,811

17 Claims. (Cl. 188—78)

This invention relates to brakes, especially to readily replaceable brake shoes having expendable linings of friction material, and my improvements are of particularly utility when embodied in brakes for the wheels of automotive vehicles, although I contemplate the use of my improvements in any field of use for which they are adapted by their nature.

The general object of the present invention is to provide a brake structure of the expanding shoe type with brake shoes arranged to be engaged with the inner peripheral surface of a drum, and which are so disposed, in pursuance of the invention, that each shoe, with its expendable friction liner, may be readily removed from the drum while the latter retains its position connected with the wheel or other rotary element of the mechanism whose movement is controlled by the brake, as in an automobile.

Another object of the invention is to provide means by which such a readily removable and replaceable set of brake shoes may be adjusted with equal ease to vary the extent of clearance between the shoe members and the inner friction surface of the drum, so that as the friction liner becomes worn by use, the brake shoe may be set up nearer to the drum, and thus compensate for the wear as it proceeds, making it possible for the operator of the brake to work it by a uniform pressure upon the brake pedal, instead of by a pressure acting through a short throw of the pedal when the brake is new, and through a much wider throw as the linings become worn off.

The factor of safety is much higher when the brakes can be operated with desirable uniformity, inasmuch as less reliance need be had upon the skill and experience of the driver of a car, and in an emergency a matter of a second of time enters vitally into the ability of the driver to avoid a fatal or serious accident.

Another object of the invention is to provide a brake structure having the advantages already mentioned and which can be installed with a minimum number of tools, using those available to the driver in the usual kit, so that, by carrying spare shoes with fresh linings, the driver of a car is at all times equipped with the essential elements for replacing shoes as readily as in the familiar case of replacement of a tire, or a wheel.

Among other objects of the invention are the provision of an unusually sturdy brake structure of the drum and expanding shoe type, and one which can be manufactured with desirable economy, and which can be marketed at a price which will attract purchasers and will also yield a fair profit to the manufacturer thereof.

Other objects and features of the invention will appear as the description of the particular physical embodiment of the invention selected to illustrate the invention proceeds.

In the accompanying drawings, like characters of reference have been applied to corresponding parts throughout the several views which make up the drawings, in which:

Fig. 3 is a fragmentary, detail view in section taken on the irregular line 3—3 of Fig. 1, and upon a larger scale;

Fig. 4 is a fragmentary, detail view; also upon a larger scale, taken on the vertical line 4—4 of Fig. 1;

Fig. 5 is a fragmentary detail view taken upon the line 5—5 of Fig. 1;

Fig. 6 is a sectional elevation taken upon the line 6—6 of Fig. 2; and Fig. 7 is a similar view with a portion of the dust plate removed to reveal interior structure.

Figure 1:
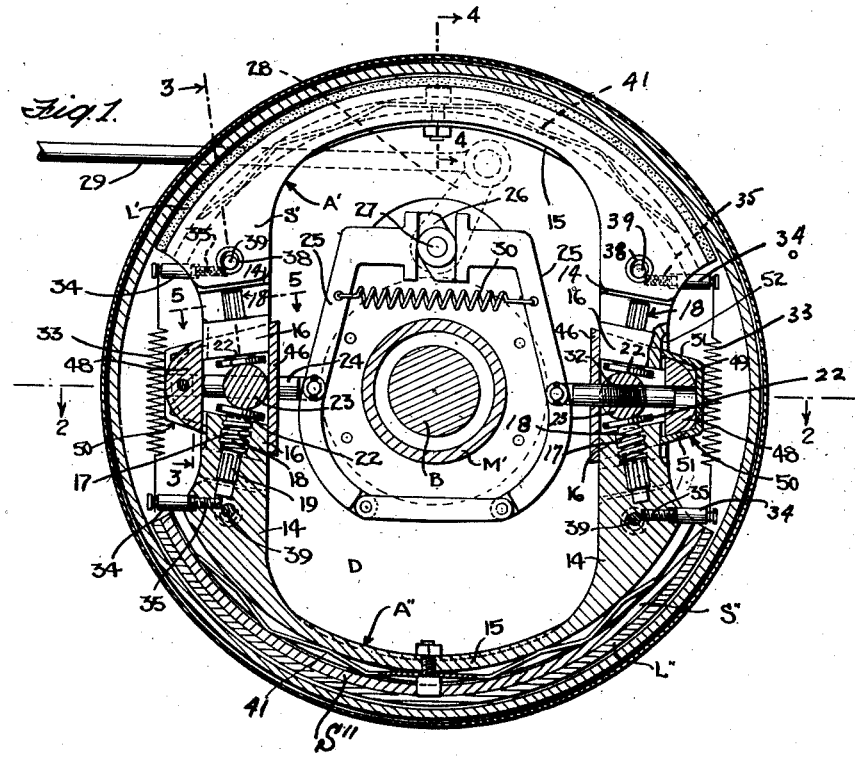
Fig. 1 is a view in sectional elevation of an automobile wheel brake in the construction of which the present invention has been embodied.

In the now-preferred embodied of the invention selected for illustration and description, the part designated by the reference character D is the drum member of one of the wheel-brakes of an automobile, shown as supported in fixed position upon the axle spindle 12 of the rear driving axle B of an automobile, by means of a hub H splined to the spindle by a feather 11, the usual nut 13 being provided to hold it in known fashion, against co-axial displacement.

Within the drum D is disposed a member, designated generally by the reference character M, which carries the braking devices A' and A'', these being each of the general shape of a rather flat yoke, and each comprising a pair of end parts 14, connected by a relatively attenuated body portion or shank 15.

Each end part 14 has an extension 16, with a tapped and threaded recess 17 which constitutes a socket for an adjuster device 18, each of said adjuster devices being threaded to turn adjustively in the socket, and each having a knurled or ribbed shank, as 19, to facilitate turning of the device by the thumb and finger of the operator, inserted through slots 20 formed in the walls 21 of the device 18, (see Figs. 3 and 5).

The free end 22 of each adjuster device 18 is formed with a disc which is adapted to be engaged with a member 23 fixed upon a plunger 24, as by a thread 32, (see Fig. 1, at the right hand side). The discs 22 are so disposed that at each side of the brake, when viewed as in Fig. 1, the discs at the adjacent ends of the braking device A' and A" will be presented in a position relatively to each other such that the faces of the discs converge toward the periphery of the drum and are forced apart by the members 23 when the plungers 24 are moved outward in a radial direction. This is effected, in the instance illustrated, by outward movement of the known type of floating brake-operating levers 25, which are forced apart by a cam 26, on a shaft 27 rocked by a crank 28 actuated by a brake-lever 29, in the ordinary course of use of the brake.

A coiled spring 30, under tension, tends normally to bias the levers 25 into engagement with the cam 26, and also to draw the plungers 24 and actuating members 23 inward radially. Another pair of coiled springs 33, under tension, serves to draw the ends 14 of the braking devices A' and A" together, acting on binding posts 34 screwed into the ends 14 as illustrated in Fig. 1 at 35.

The yoke-shaped members A' and A" serve respectively as operator members for the brake-shoes S' and S", these being of U-shape in cross section, having side flanges 36 and 37 which embrace the sides of their supports A' and A" respectively, the portion indicated by the reference letter S', for example, as in Fig. 3, serving to cover a groove 40 in which is enclosed a leaf-spring 41 having a wavy contour, as best seen in Fig. 1, there being one of these springs associated with each of the brake-shoes S' and S", acting to bias the shoes outwardly, and having the characteristic of yielding resistantly when the brakes are applied, so that a resilient braking action is assured.

The friction linings may be made of any known or suitable material, and the shoes may likewise be made of conventional or otherwise suitable material, riveted or secured in any suitable manner to the shoes S' and S".

At each end 14 of the brake-shoes their flanges 36 and 37 are provided with bushed orifices 38 through which extend rods 39, transfixing the members A' and A" respectively and enough smaller in diameter than that of the bushed orifices 38 to permit accommodation of the shoes S' and S" respectively when the linings L' and L" respectively become engaged with the rim of the drum D and the members A' and A" are moved onward a short distance radially relatively to the shoes S' and S", the braking engagement being of an order frictionally sufficient to gain maximum braking torque, but at no time adequate to lock the wheels.

At the mid-region of the springs 41 respectively they are illustrated as secured to the attenuated web 15 of the member A' and the member A" respectively as by a bolt which may be desirably of the form shown in Fig. 4, wherein the bolt 42 has a lozenge-shaped head 43 fitted loosely in an orifice 44 in the cross-web of member S', the other end of the threaded shank of the bolt being fastened removably by a nut 45.

It will now be evident that, in pursuance of the present invention, the shoe S' and its liner L' constitute, with the spring 41, a unitary structure with the member A' by which it is supported, and with the adjuster devices 18 and their discs 22; also the connecting rods 39, and the binding posts 34 whose threaded ends 35 are abutted against the mid-portions of the connecting rods 39 and thus prevent the latter from falling out of the bushed orifices 38.

It is further evident that each of these unitary structures can be removed as such from the circumjacent drum D through the open side thereof; and that when either of the brake elements constituted by one of the unitary structures comprising a support, as A', with its associated shoe-member as S' and its complemental liner as L', and spring member 41, shall have been so removed, it will then be possible, in pursuance of my invention, to remove, from the support A', without further dismantling of the brake, each shoe-member, as S', and its complemental liner, as L', while the spring member 41 remains held in place upon the operator member or support A'. It follows that a fresh shoe-and-liner element may be substituted with ease and the unitary structure replaced in the drum, so that a notable advance has been made by me in this novel provision.

It will of course be understood that, preparatory to removal of the shoe from the operator device, it will be necessary to unfasten the springs 33, and unscrew the binding posts 34 partially, in order to release the connecting rods 39, which can then be readily slid out from the bushed orifices 38.

Figure 2:
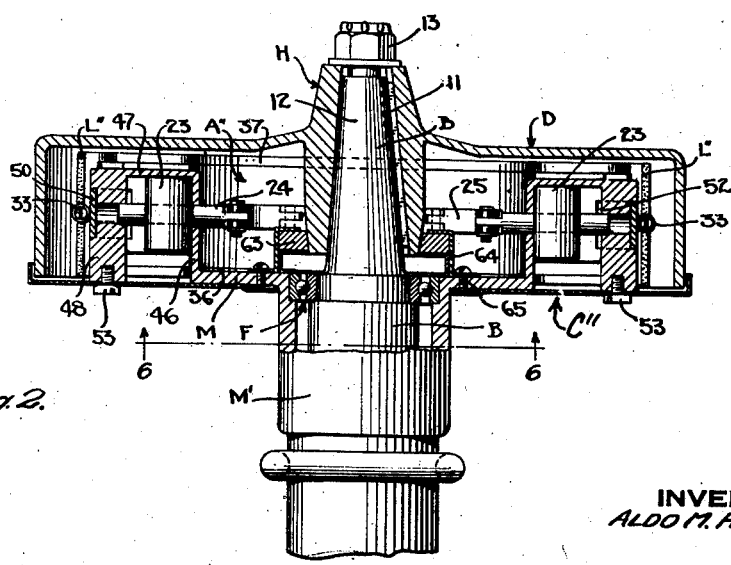
Fig. 2 is a view in transverse section taken on the diametrical line 2—2 of Fig. 1.

In further pursuance of the invention, provision is made for housing the ends, as 16, of the yoke-shaped members A' and A" in such fashion that they will be guided in their to-and-fro movements during the operations of applying and letting-off the brakes, and for this purpose I have formed the base-plate M (see Fig. 2), with an integral housing structure which has a wall 46 at right angles to the plane of the base-plate M, and a wall 47 parallel to M, the third wall 48 of the housing having one face parallel to the wall 46, so that between these last-named walls there is formed a guideway for the ends 16, serving to guide them both in their brake-applying and releasing movements, and in their movements in a direction perpendicular to the base-plate, for the purpose of removal.

In carrying into effect another object of the invention, which is to hold the removable elements in place at all times, save when their removal is desired, provision is made of a key 50 at each of the housings, this instrumentality being preferably of the shape of a broad inverted U, the legs 51 of which straddle the arcuate shaped wall 49 of the housing, and have feet which enter a groove 52 in each of the ends 16 of the members A' and A"; (see right hand of Fig. 1). These keys act, one at each side of the brake, directly upon the members A' and A", to hold them in their described positions for use, and the coiled springs 33 aid to keep the keys 50 from being thrown out by casual shocks and vibrations, such as may be encountered in the use of an automobile. The keys may be readily plucked from their illustrated position by the operator's hand, without the use of a tool, when it is desired to free the braking elements for removal.

Provision is made also by the present invention for so closing the open side of the drum that dust, etc., will be excluded from the interior of the drum and from the working parts contained therein, and yet the closure means may be removed with unusual facility to give access to the braking elements when a renewal of the shoe-and-liner parts is required. For this purpose the dust-plate shown is divided into two sections, C' and C", as shown clearly in Figs. 6 and 7, cap-screws 53 being provided to span the joint between the half-moon shaped components of the dust-plate, and these screws can be readily removed by a user of the invention, as the heads of the screws will be accessible for the employment of a screw driver, when the brake structure illustrated is mounted upon the driving (rear) wheel of an automobile. Provision is made for holding the parts C' and C'' together yieldingly, as by the use of small coil springs 54 (see Fig. 6), and it will be readily understood that if the screws 53 be loosened, without complete removal of the screws, the dust cap structure can be pulled slightly apart, only enough to clear the heads of the screws and then the parts C' and C'', still held together by the springs 54, can be slid along the sleeve M' of the axle-supporting structure, and left there ready for replacement after the cold shoe-and-liner article shall have been removed and the fresh unit put in place, in the manner already described.

In the modification illustrated in Fig. 7, instead of the cam 26, as shown in Fig. 1, acting to force apart the brake elements, as already described, use is made of a hydraulic brake-actuating cylinder, substantially as illustrated at 56, the operating fluid being admitted at 57, and adapted to act centrally upon the oppositely facing pistons 61 and 62; and the pistons act in turn upon the piston arms 59 and 60, these in turn thrusting apart the ends 25x of brake-actuating levers 25, similar in arrangement and purpose with the similarly lettered parts already described.

While I have described particular physical embodiments of the invention, it is to be understood that such embodiments are merely illustrative and do not exhaust the possible physical embodiments of the idea of means which underlies the invention herein disclosed.

I have described what I believe to be the best embodiment of my invention. I do not wish, however, to be confined to the embodiments shown, but what I desire to cover by Letters Patent is set forth in the appended claims.

I claim:

1. A brake of the class described having an open-sides drum and a radially disposed base-plate, one of said parts being rotatable relatively to the other around a common axis; said brake being characterized by the provision upon said base-plate of housings in spaced apart positions around said axis, and a set of removable braking devices each comprising a yoke-shaped supporting member and a shoe of U-shaped cross section provided with an expendable friction liner, said yoke-shaped member, shoe and complemental friction liner constituting a unitary structure supported loosely in said housings, and removable therefrom as a unitary structure, while the drum and base-plate remain in their assembled relation.

2. A wheel brake of the class described; having an open-sided drum and a base-plate disposed in the open side of said drum, one of said parts being rotatable relatively to the other around a common axis; said brake being characterized by the provision upon said base-plate of a pair of housings in diametrically spaced apart positions around said axis; and a set of removable braking devices each comprising a yoke-shaped supporting member and a shoe of U-shaped cross-section provided with an expendable friction lining, said yoke-shaped member, shoe and complemental friction lining constituting a unitary structure supported loosely in said housings, and removable therefrom as a unitary structure, while the drum and base-plate remain in their assembled relation.

3. An automobile wheel brake of the drum and expanding shoe type; said brake being characterized by having a pair of removable braking elements each comprising a yoke-shaped operator member, a brake shoe U-shaped in cross section enveloping said yoke-shaped member throughout its length and along its sides, and a rod transfixing said members near each of their contiguous ends, said members being adapted to be installed in combined relation and removed as a unitary structure, and also being demountable from each other upon removal of said rods.

4. An automobile wheel brake of the drum and expanding shoe type; said brake being characterized by having a pair of removable braking elements each comprising a yoke-shaped operator member, a brake shoe U-shaped in cross section enveloping said yoke-shaped member throughout its length and along its sides, and a rod transfixing said members near each of their contiguous ends, said members being adapted to be installed in combined relation and removed as a unitary structure, and also being demountable from each other upon removal of said rods, said brake shoe being further characterized by having an expendable friction liner permanently associated therewith.

5. A brake element for an expanding shoe brake; said element comprising a yoke-shaped operator member, a U-shaped shoe surrounding said member on three sides from end to end, and provided with an expendable liner on its braking face, said element being further characterized by having a flat spring enclosed between said yoke and shoe, whereby a yieldingly resistant braking action by said element in use is assured.

6. A braking element of the class described, said element comprising a yoke-shaped operator member having an extension provided with an adjuster device formed with a disk shaped head, a reduced threaded shank portion adjacent the head, a roughened shank portion more remote from the head adapted to be adjustively turned by hand, and a reduced bearing portion at the end opposite the head.

7. A braking element of the class described, said element comprising a yoke-shaped operator member having an extension provided with an adjuster device formed with a disk and a roughened shank adapted to be adjustively turned by hand and a shoe member of arcuate trough shape adapted to surround three sides of said yoke member and having an expendable lining, said adjuster device being adapted to vary the position of said shoe member together with its lining, relatively to said yoke-shaped operator member.

8. A braking element of the class described, said element comprising a yoke-shaped operator member having at each end thereof an adjuster device screwed adjustively into a threaded socket in said end; a shoe member of trough shape surrounding said yoke on three sides throughout its length; a spring confined between said operator member and said trough-like member and yoke member at each end, forming a loose connection permitting play between said members under the influence of said spring.

9. A braking element of the class described, said element comprising a yoke-shaped operator member having at each end thereof an adjuster device screwed adjustively into a threaded socket in said end; a shoe member of trough shape surrounding said yoke on three sides throughout its length; a spring confined between said operator member and said trough-like member and yoke member at each end, forming a loose connection permitting play between said members under the influence of said spring and a binding post adapted to be engaged retentively with said rod at each end.

10. A brake of the drum and expanding shoe type; said brake comprising a pair of operator members having a yoke-like contour, and provided at their adjacent ends with adjuster devices presented in opposed pairs at each side of the brake; a base-plate extending across the open side of said drum and formed at each side with a housing adapted to guide said adjuster devices in to-and-fro operating movements; a clip mounted on each of said housings and adapted to hold said guided ends of the yokes in position for actuation; and actuating means within said housing at each side of the brake, one for each pair of said adjuster devices, and each actuating device being adapted to be moved between the members of one of said pairs to force them apart and thereby to apply said brake; a plunger extending into each housing to operate said actuating member therein; an actuating lever for each plunger; a cam to actuate each of said levers; manually operable means to rotate said cam; a link connecting said levers at one of their adjacent ends; and a coil spring under tension connecting their other ends, to bias them toward said cam.

11. A wheel brake of the class described, comprising a drum and expanding brake shoes; said brake including a base-plate mounted upon a part stationary relatively to said drum, and having a pair of housings at opposite sides of the axis of said drum, said housings opening toward the open side of the drum at the inside of the wheel; a pair of braking elements mounted floatingly in said drum and provided with operating devices guided in said housings, being removable altogether from said housings through the open side of the drum; and a dust cap adapted to be secured in position to close said open side of the drum and composed of two parts removable in part radially from the axis of said drum and in part along said axis while still connected with each other.

12. A braking element for a brake of the expanding shoe type, said element comprising a supporting yoke having a grooved periphery; a flat spring in said groove and secured to said yoke at its mid-region by a bolt having a lozenge shaped head; and a shoe member of inverted trough shape mounted loosely upon said yoke confining said spring and held in centered position loosely by said bolt-head.

13. A wheel brake of the class described, comprising a drum and expanding brake shoes; said brake including a base-plate mounted upon a part stationary relatively to said drum, and having a pair of housings at opposite sides of the axis of said drum, said housings opening toward the open side of the drum at the inside of the wheel; a pair of braking elements mounted floatingly in said drum and provided with operating devices guided in said housings, being removable altogether from said housings through the open side of the drum; and a dust cap adapted to be secured in position to close said open side of the drum and composed of two parts removable in part radially from the axis of said drum and in part along said axis while still connected with each other, each of said braking devices comprising a supporting yoke, a shoe spaced from and surrounding the peripheral portion of said supporting yoke and a spring bent at intervals to form flat-angled salients by which the space between said yoke and said shoe is defined.

14. A brake as claimed in claim 1, and in which a manually operable means is provided to actuate said set of braking devices.

15. A brake as claimed in claim 1 and in which a fluid-pressure means is provided to actuate said set of braking devices.

16. An operator device for applying a pair of expanding braking elements; said device comprising a stirrup-shaped housing provided with intersecting channels one of which is adapted to receive and guide a plunger connected with a cam-operated brake actuating lever, and the other channel being adapted to guide a pair of opposed brake operator ends one on each side of said plunger, and a cylindrical part screwed upon said plunger and adapted to be engaged with said operator ends, the latter being furnished with disks inclined with respect to each other to promote a wedging action of said cylindrical member therebetween.

17. A braking device comprising the combination of a hollow annular brake drum adapted for attachment to the wheel of a vehicle and means mounted within said drum for applying braking pressure to the interior surface thereof, said means comprising a pair of opposed brake shoes, an expandable friction liner secured to the outer surface of each brake shoe and curved to conform to the interior surface of the brake drum, inwardly directed members connected to the end portions of said brake shoes and terminating in opposed faces converging toward the periphery of the drum, a member disposed between each pair of said converging faces and having a curved surface in contact therewith, a radially directed link connected to each of said last named members, a pair of floating levers connected to the inner ends of said links, spring means for biasing said floating levers inwardly and means operating on the end portions of said levers for spreading them apart against the bias of the spring means.

ALDO M. FRANCHI.